United States Patent
Varekamp et al.

(10) Patent No.: US 10,298,905 B2
(45) Date of Patent: May 21, 2019

(54) METHOD AND APPARATUS FOR DETERMINING A DEPTH MAP FOR AN ANGLE

(71) Applicant: KONINKLIJKE PHILIPS N.V., Eindhoven (NL)

(72) Inventors: Christiaan Varekamp, Veldhoven (NL); Patrick Luc Els Vandewalle, Oud-Turnhout (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/573,876

(22) PCT Filed: Jun. 15, 2016

(86) PCT No.: PCT/EP2016/063711
§ 371 (c)(1),
(2) Date: Nov. 14, 2017

(87) PCT Pub. No.: WO2016/202837
PCT Pub. Date: Dec. 22, 2016

(65) Prior Publication Data
US 2018/0295340 A1  Oct. 11, 2018

(30) Foreign Application Priority Data

Jun. 16, 2015  (EP) ..................... 15172402

(51) Int. Cl.
*H04N 5/77* (2006.01)
*H04N 9/73* (2006.01)
(Continued)

(52) U.S. Cl.
CPC .......... *H04N 13/128* (2018.05); *G06T 5/002* (2013.01); *G06T 5/20* (2013.01); *G06T 7/12* (2017.01);
(Continued)

(58) Field of Classification Search
CPC .. G06T 5/002; G06T 5/20; G06T 7/12; H04N 13/122; H04N 13/128; H04N 13/271; H04N 13/275
(Continued)

(56) References Cited

U.S. PATENT DOCUMENTS 7,672,507 B2   3/2010  Fan
9,105,114 B2 *  8/2015  Dohta ..................... G06T 15/00
(Continued)

FOREIGN PATENT DOCUMENTS

WO   2005013623 A1   2/2005
WO   2006117707 A2   11/2006
WO   2014072926 A1   5/2014

OTHER PUBLICATIONS

Jiawen Chen et al: "Real-time edge-aware image processing with the bilateral grid" ACM Transactions on Graphics (TOG), ACM,US, Jul. 29, 2007 (Jul. 29, 2007), pp. 103-103-9.
(Continued)

*Primary Examiner* — Robert Chevalier

(57) ABSTRACT

An apparatus receives an image and an associated depth map comprising input depth values. A contour detector (405) detects contours in the image. A model processor (407) generates a contour depth model for a contour by fitting a depth model to input depth values for the contour. A depth value determiner (409) determines a depth model depth value for at least a one pixel of the contour from the contour depth model. The depth model may e.g. correspond to a single depth value which e.g. may be set to a maximum input depth value. A modifier (411) generates a modified depth map from the associated depth map by modifying depth values of the associated depth map. This includes generating a modified depth value for a pixel in the modified depth map in response to the depth model depth value. The depth model
(Continued)

depth value may e.g. replace the input depth value for the pixel.

20 Claims, 9 Drawing Sheets

(51) Int. Cl.
| | |
|---|---|
| *H04N 13/128* | (2018.01) |
| *G06T 5/00* | (2006.01) |
| *G06T 5/20* | (2006.01) |
| *G06T 7/12* | (2017.01) |
| *H04N 13/122* | (2018.01) |
| *H04N 13/271* | (2018.01) |
| *H04N 13/275* | (2018.01) |
| *H04N 13/00* | (2018.01) |

(52) U.S. Cl.
CPC ......... *H04N 13/122* (2018.05); *H04N 13/271* (2018.05); *H04N 13/275* (2018.05); *G06T 2207/10028* (2013.01); *G06T 2207/20028* (2013.01); *G06T 2207/20192* (2013.01); *H04N 2013/0081* (2013.01); *H04N 2213/003* (2013.01)

(58) Field of Classification Search
USPC .......... 348/46, 51, 61, 25, 26; 386/209, 210, 386/224, 227, 232
See application file for complete search history.

(56) References Cited

U.S. PATENT DOCUMENTS

| | | |
|---|---|---|
| 2010/0208942 A1 | 8/2010 | Porter et al. |
| 2015/0116353 A1 | 4/2015 | Miura et al. |

OTHER PUBLICATIONS

Lang, M., Hornung, A., Wang, O., Poulakos, S., Smolic, A. & Gross, M., "Nonlinear Disparity Mapping for Stereoscopic 3D. ACM Transactions on Graphics (Proc. SIGGRAPH)". Jul. 2010. http://zurich.disneyresearch.com/~malang/projects/DisparityMapping/.

P. Arbelaez, M. Maire, C. Fowlkes and J. Malik, "Contour detection and Hierarchical Image Segmentation", IEEE Transactions on Pattern Analysis and Machine Intelligence, vol. 33, No. 5, 2011. DOI: 10.1109/TPAMI.2010.161.

* cited by examiner

METHOD AND APPARATUS FOR DETERMINING A DEPTH MAP FOR AN ANGLE

CROSS-REFERENCE TO PRIOR APPLICATIONS

This application is the U.S. National Phase application under 35 U.S.C. § 371 of International Application No. PCT/EP2016/063711, filed on Jun. 15, 2016, which claims the benefit of EP Patent Application No. EP 15172402.8, filed on Jun. 16, 2015. These applications are hereby incorporated by reference herein.

FIELD OF THE INVENTION

The invention relates to a method and apparatus for determining a depth map for an image, and in particular, but not exclusively, for determining a depth map based on estimated disparity values.

BACKGROUND OF THE INVENTION

Three dimensional (3D) displays add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

The quality of the presented three dimensional image depends on the quality of the received image data, and specifically the three dimensional perception depends on the quality of the received depth information. However, in many practical applications and scenarios the provided depth information tends to be suboptimal.

For example, in many embodiments it may be desirable to generate view images for new viewing directions. Whereas various algorithms are known for generating such new view images based on an image and depth information, they tend to be highly dependent on the accuracy of the provided (or derived) depth information.

Indeed, three dimensional image information is often provided by a plurality of images corresponding to different view directions for a scene. Specifically, video content, such as films or television programs, are increasingly generated to include some 3D information. Such information can be captured using dedicated 3D cameras that capture two simultaneous images from slightly offset camera positions.

However, in many applications, the provided images may not directly correspond to the desired directions, or more images may be required. For example, for autostereoscopic displays, more than two images are required, and indeed often 9-26 view images are used.

In order to generate images corresponding to different view directions, view point shifting processing may be employed. This is typically performed by a view shifting algorithm which uses an image for a single view direction together with associated depth information. However, in order to generate new view images without significant artefacts, the provided depth information must be sufficiently accurate.

Unfortunately, in many applications and use scenarios, the depth information may not be as accurate as desired. Indeed, in many scenarios depth information is generated by estimating and extracting depth values by comparing view images for different view directions.

In many applications, three dimensional scenes are captured as stereo images using two cameras at slightly different positions. Specific depth values may then be generated by estimating disparities between corresponding image objects in the two images. However, such depth extraction and estimation is problematic and tends to result in non-ideal depth values. This may again result in artefacts and a degraded three dimensional image quality.

Three dimensional image degradation and artefacts tend to be particularly significant for transitions between different image objects. Further, determination of depth information based on disparity estimation for associated images are also typically related to consideration of characteristics of image objects. Typically, disparity estimation algorithms search for correspondences between a left and right image by comparing color differences locally between a point in the left image and its corresponding point in the right image.

However, the resulting depth map is typically relatively inaccurate and in order to improve the depth map, post-filtering of the depth map is applied. The post-filtering may specifically be a bilateral color and/or luminance adaptive filter wherein the filtering kernel is adaptive to reflect the visual properties of the image. Such a bilateral filter may result in the depth map being adapted to more closely follow the characteristics of the image, and it may result in improved consistency and temporal stability of the estimated disparities, or may e.g. provide a sharper depth transition between different image objects.

FIG. 1 illustrates an example of a typical processing flow that may be used to produce a disparity map. A left-eye and a right-eye image are input to a disparity estimation block 101 which outputs a disparity map that is typically at block resolution (e.g. 4×4, 8×8 or 16×16 pixels). One of the original images is then used in a bilateral filter 103 to filter this disparity map and produce a bilaterally filtered depth map. After filtering, the disparity map is modified at pixel resolution. The filter may typically force pixels that are spatially close-by and which have the same color to have the same disparity.

Due to color/luminance similarity of objects on both sides of long object boundaries, the bilateral color/luminance-adaptive filters may cause disparity errors or artefacts close to such boundaries. As a consequence, close to an object boundary, the distance to objects in the background may be underestimated whereas the distance to objects in the foreground may be overestimated. When using the obtained disparity map for view generation, e.g. for auto-stereoscopic viewing, the boundaries may become distorted. Human observers tend to be very sensitive to such distortions and artefacts.

For example, the bilateral filter 103 of FIG. 1 works very well for boundaries between two objects which have fairly constant visual properties that are very different for the two objects. For example, it may work extremely well for two objects both having a uniform color (with no large intensity fluctuations within the object) but with a large difference in intensity.

However, for other objects, such as specifically objects that have a high degree of texture, a bilateral filter will be much less effective and indeed may introduce artefacts. Specifically, for textured objects the disparity of the foreground may often leak into the background and vice-versa.

This artefact is most visible on object boundaries since we know as human observers that the shape of an object's boundary as projected in the image plane will only exhibit small changes in geometry with a small shift in camera position. This effect is illustrated in FIG. 2. As illustrated, a smooth object boundary of the perspective projection of a 3D object will not likely show high-frequency changes in geometry from a left-eye image $I_L$ to a right-eye image $I_R$, i.e. the scenario of FIG. 2a is likely to reflect a real scene whereas the irregularities of FIG. 2b (which may be due to textured objects) is much less likely to reflect the scene.

Hence, an improved approach for determining suitable depth information would be advantageous and in particular an approach allowing increased flexibility, facilitated implementation, reduced complexity, improved depth information, reduced sensitivity to visual variations such as texture, an improved 3D experience and/or improved perceived image quality would be advantageous.

SUMMARY OF THE INVENTION

Accordingly, the invention seeks to preferably mitigate, alleviate or eliminate one or more of the above mentioned disadvantages singly or in any combination.

According to an aspect of the invention there is provided an apparatus for generating a depth map, the apparatus comprising: an image generator for providing an image and an associated depth map comprising input depth values; a contour detector for detecting at least a first contour in the image, the first contour comprising a first set of pixels; a model processor for generating a contour depth model for the first contour by fitting a depth model to input depth values for the first set of pixels; a depth value determiner for determining a depth model depth value for at least a first pixel of the first set of pixels from the contour depth model; and a modifier for generating a modified depth map from the associated depth map by modifying depth values of the associated depth map; wherein the modifier is arranged to generate a first modified depth value for the first pixel in the modified depth map in response to the depth model depth value.

The approach may in many embodiments allow an improved depth map to be generated which e.g. may provide improved quality when used for image processing. For example, in many embodiments and scenarios, an improved presentation of image objects may be achieved using the modified depth map. The improvement may in particular be significant when the modified depth map is used for image view shifting and/or when presenting three dimensional images on an autostereoscopic display. The approach may in particular in many scenarios reduce or remove depth inconsistencies, irregularities, noise, and/or artefacts around image object edges.

One or more of the depth maps may be a partial map. The depth values comprised in the depth maps may be any suitable representation of depth, such as specifically a depth coordinate (z) value or a disparity value representing shifts between images of different view directions. The associated depth map may be any full or partial depth map which provides a direct or indirect indication of depths of image objects/regions in the image.

The contour detector may be arranged to detect a plurality of contours, each of which may e.g. be processed individually. The contour detector may detect the first contour in response to a spatial variation in the image of a visual property, such as specifically in response to spatial variation for a color and/or luminance of the image.

The contour detector may specifically be arranged to detect the first contour in response to a visual property change constraint and a geometric constraint. The contour detector may specifically evaluate a contour requirement and determine the first set of pixels as a set of pixels that meet the contour requirement. The contour requirement may comprise both a visual property change constraint and a geometric constraint. The visual property change constraint may specifically be a color and/or luminance change constraint, and may in particular be a texture dissimilarity constraint. The geometric constraint may be a constraint relating (only) to the positions of pixels.

The contour may in some embodiments be a curved line (also often referred to as a curve) in the image. The curved line may specifically in some scenarios and embodiments be a straight line. The contour may in some embodiments form a one dimensional curve in the image. In many embodiments, the first set of pixels may form a curved line. The contour depth model may in many embodiments describe a curved line, and specifically a straight line, in a three dimensional space formed by two dimensions represented by the image and a depth dimension represented by the (input) depth values. In many embodiments, the contour depth model may be a single linear transition from the start to the end of the curve. In many embodiments, the contour depth model may be a linear or piecewise linear model.

The fitting of the depth model to input depth values by the model processor and the determination of the depth model depth value by the depth value determiner may be performed as a single process of applying a constraint to one or more input depth values of the first contour.

The depth model may represent one or more characteristics or constraints for the contour depth model. The characteristic or constraint may be predetermined. The characteristic or constraint is independent of the depth values. For example, the depth model may provide the constraint that the contour depth model must provide only a single depth value for all pixels, must be linearly dependent on positions, must have a spatial gradient less than a threshold, may not comprise higher spatial frequencies etc. For example, the depth model may comprise or consist in a constraint in the spatial frequency distribution of the contour depth model, and may e.g. specifically correspond to a spatial low pass filter.

The contour depth model may be represented by a function allowing e.g. the depth model depth value for a given pixel to be determined as a function of a position (e.g. relative to the determined contour) of that first pixel. In such cases, the contour depth model may e.g. be determined by the model processor determining a parameter of the function based on at least one input depth value for the first contour. In some embodiments, the contour depth model may be represented directly by individual values for pixels of the first contour. In such scenarios, the contour depth model may e.g. be determined by the model processor determining depth model depth values for pixels of the first contour by applying a constraint, such as a low pass filtering, to the input depth values for pixels of the first contour. In such embodiments, the determination of the depth model depth value for the first pixel by the depth value determiner may be directly by retrieving the value determined by the model processor.

The fitting of the depth model may be in response to input depth values of only the first set of pixels. The fitting of the depth value may consider no other input depth values than those of the first set of pixels.

The modifier may for the first pixel in some embodiments include at least one of a combination of the depth model depth value and the input depth value for the first pixel, and a replacement of the input depth value for the first pixel by the depth model depth value. In some embodiments, the modifier may in addition also apply other modifications to the first depth value, such as e.g. a limitation or spatial filtering. The modifier may in some embodiments modify only depth values detected to belong to the contour but may in other embodiments also include modification of other depth values.

In accordance with an optional feature of the invention, the modifier is arranged to set the first modified depth value to the depth model depth value.

The first modified depth value may replace the input depth value for the first pixel.

The feature may provide an advantageous three dimensional experience while maintaining low complexity and robust operation.

In accordance with an optional feature of the invention, the modifier is arranged to generate the first modified depth value as a combination of the depth model depth value and an input depth value for the first pixel.

This may in many embodiments allow an improved three dimensional rendering based on the modified depth map, and may in particular in many embodiments allow reduced artefacts and/or noise.

In accordance with an optional feature of the invention, the contour detector is arranged to generate a soft decision detection value, the combination is a weighted combination, and the modifier is arranged to determine a weighting of at least one of the depth model depth value and the input depth value for the first pixel in response to the soft-decision detection value.

This may in many embodiments allow an improved three dimensional rendering based on the modified depth map, and may in particular in many embodiments allow reduced artefacts and/or noise.

The soft decision detection value may be a confidence value indicative of an estimated probability that the first set of pixels match a contour in the image. The weighting of the depth model depth value relative to the weighting of the input depth value may be increased for an increasing estimated probability that the first set of pixels match a contour in the image.

In accordance with an optional feature of the invention, the contour detector is arranged to generate the soft decision detection value in response to a geometric property of the first contour.

This may provide improved performance in many scenarios. Specifically, in many embodiments, geometric characteristics may provide a particularly good indication of whether a set of pixels determined based on visual characteristics indeed does correspond to a contour or not.

In accordance with an optional feature of the invention, the contour depth model is a constant depth value model.

This may in many embodiments allow an improved three dimensional rendering based on the modified depth map, and may in particular in many embodiments allow reduced artefacts and/or noise. It may further allow low complexity. The constant depth value model provides the same depth value for all pixels of the first set of pixels, i.e. a single depth value is allocated to all pixels of the contour.

In accordance with an optional feature of the invention, the model processor is arranged to generate contour depth model as one of an extreme input depth value, an average input depth value, and a median input depth value for the first set of pixels.

This may provide particularly attractive results in many embodiments and scenarios while allowing low complexity and resource demand.

In accordance with an optional feature of the invention, the contour depth model is a linear depth value model.

This may provide particularly attractive results in many embodiments and scenarios while allowing low complexity and resource demand. Specifically, it may often provide more realistic depth transitions while still maintaining low complexity and reducing noise/artifacts.

In accordance with an optional feature of the invention, the contour detector is arranged to determine the first contour under a constraint of a geometric requirement for the first set of pixels.

This may provide improved performance in many embodiments.

In accordance with an optional feature of the invention, the geometric requirement comprises a requirement for the first set of pixels to form a geometric shape not exceeding a maximum curvature.

This may provide improved performance in many embodiments.

In accordance with an optional feature of the invention, the apparatus further comprises a bilateral filter for filtering the associated depth map based on the image prior to modification by the modifier.

Such a combination of the bilateral filter and the depth map modification may provide a particularly advantageous result with a synergistic effect between the filter and the modification. Specifically, the bilateral filter may improve the depth map, and e.g. reduce noise, while the modification may reduce the potential artefacts or transition noise that may be introduced in some parts of the image by the filtering.

In accordance with an optional feature of the invention, the contour detector is arranged to detect the first contour in response to contour requirement comprising both a visual property change constraint and a geometric constraint.

In accordance with an optional feature of the invention, the image generator is arranged to generate the associated depth map in response to a disparity estimation based on the image and a second image corresponding to a different viewing direction.

According to an aspect of the invention there is provided a method of generating a depth map, the method comprising: providing an image and an associated depth map comprising input depth values; detecting at least a first contour in the image, the first contour comprising a first set of pixels; generating a contour depth model for the first contour by fitting a depth model to input depth values for the first set of pixels; determining a depth model depth value for at least a first pixel of the first set of pixels from the contour depth model; and generating a modified depth map from the associated depth map by modifying depth values of the associated depth map; wherein generating a modified depth map comprises generating a first modified depth value for the first pixel in the modified depth map in response to the depth model depth value.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a system for determining a modified depth map which specifically may be used for generating images for different view directions of a scene, such as for example an approach for generating additional images for presentation of an input stereo image on an autostereoscopic display. However, it will be appreciated that the invention is not limited to this application but may be applied to many other applications and systems, and that the modified depth map may be used for many other purposes.

Figure 3:
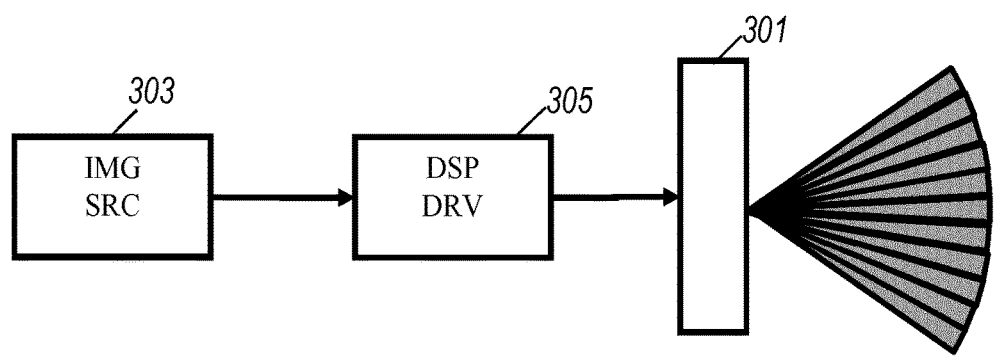
FIG. 3 illustrates an example of a three dimensional display system.

FIG. 3 illustrates an example of a system in accordance with some embodiments of the invention. In the specific example, images corresponding to different views of an autostereoscopic display 301 are generated from an input three dimensional image received from an image source 303. The input three dimensional image may for example be represented by a single image with an associated depth map, or may e.g. be represented by stereo images from which an associated depth map is extracted.

Typically, autostereoscopic displays produce "cones" of views where each cone contains multiple views that correspond to different viewing angles of a scene. The viewing angle difference between adjacent (or in some cases further displaced) views are generated to correspond to the viewing angle difference between a user's right and left eye. Accordingly, a viewer whose left and right eye see two appropriate views will perceive a three dimensional effect.

Autostereoscopic displays tend to use means, such as lenticular lenses or parallax barriers/barrier masks, to separate views and to send them in different directions such that they individually reach the user's eyes. For stereo displays, two views are required but most autostereoscopic displays typically utilize more views. Indeed, in some displays a gradual transition of view directions is performed over an image such that different parts of an image may be projected in different viewing directions. Thus, in some more recent autostereoscopic displays a more gradual and continuous distribution of image regions over view directions may be applied rather than the autostereoscopic display rendering a fixed number of complete views. Such an autostereoscopic display is often referred to as providing fractional views rather than full views. More information on fractional views may e.g. be found in WO 2006/117707.

However, common for most autostereoscopic displays is that they require image information to be generated for a relatively large number of different view directions. However, typically three dimensional image data is provided as a stereo image or as an image with a depth map. In order to generate the required view directions, image view shifting algorithms are typically applied to generate suitable pixel values for rendering. However, such algorithms are typically suboptimal and may introduce artefacts or distortions.

In the system of FIG. 3, a display driver 305 receives the input three dimensional image from the image source 303 and generates the view images for the autostereoscopic display 301. The display driver 305 is specifically arranged to generate new and/or additional view images corresponding to the view directions of the individual views of the autostereoscopic display 301.

The display driver 305 may accordingly be arranged to generate images corresponding to new directions by view shifting based on at least one received image and associated depth information. However, rather than directly use a received depth map or a depth map generated by disparity estimation from a plurality of received images, the display driver 305 is arranged to first generate a modified depth map which is then used by the view shifting algorithm to generate new images. The approach will be described in more detail in the following with reference to FIG. 4 which illustrates elements of the display driver 305 of FIG. 3.

The display driver 305 comprises an image generator 401 which is arranged to provide at least one image and an associated depth map where the associated depth map provides depth information for at least some, and typically all, of the pixels of the image. Typically, the depth map may provide a depth value for each pixel of the image (although possibly at a lower spatial or temporal resolution).

It will be appreciated that in some embodiments, the depth map may comprise more indirect depth information for the pixels of the image. For example, in some embodiments, the depth map may be provided for a slightly different view direction than the image (e.g. a left eye depth map may be provided with a right eye image).

The depth values comprised in the depth maps may be any suitable representation of depth, such as specifically a depth coordinate (z) value or a disparity value representing shifts between images of different view directions. In the following, depth values may specifically refer to disparity values such that a higher depth value may correspond to a higher disparity for objects in front of the screen. Thus, a higher depth value will be considered to reflect a position closer to the viewer.

In some embodiments, the image generator 401 may simply receive an image with an associated depth map from an external or internal source, such as specifically the image source 303. In other embodiments, the image generator 401 may itself be arranged to generate the associated depth map.

In particular, in many embodiments, the image generator 401 may receive a plurality of images corresponding to different view directions for the same scene (typically simultaneous images) and may then proceed to generate a depth map based on disparity estimation.

Thus, in many embodiments, the image generator 401 may be arranged to receive a three dimensional image formed by a plurality of images corresponding to different view directions, such as specifically a stereo image, and it may be arranged to perform disparity estimation to generate the input associated depth map.

The image generator 401 may specifically be arranged to generate a depth map in response to a disparity detection between at least two of the view direction images, i.e. it may proceed to find corresponding image objects in the images, determine the relative shift/disparity between these, and assign the corresponding depth level to the image objects. It will be appreciated that any suitable algorithm for determining depth based on disparity estimation may be used.

Such a disparity estimation may lead to relatively accurate depth maps. However, the depth maps may still typically comprise a relatively large number of errors and may typically not be fully consistent. In particular, artefacts and inconsistencies may be prevalent around large and sharp depth transitions.

Therefore, directly using a depth map generated from disparity estimation for images for different directions may tend to result in perceived quality degradation and introduction of artefacts, e.g. when performing view shifting.

Figure 1:
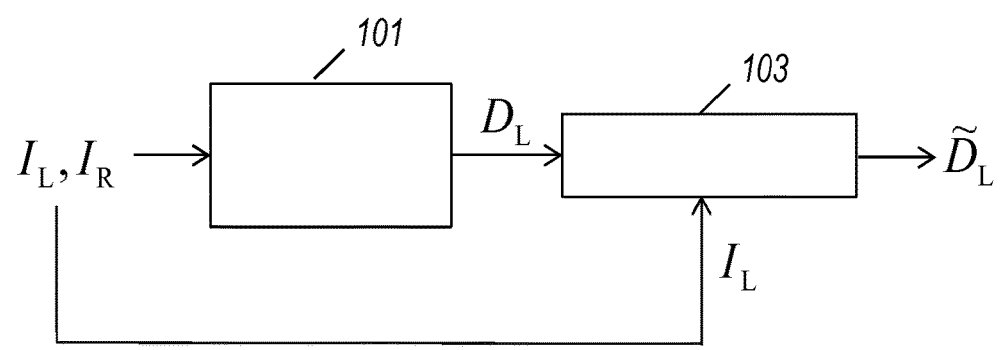
FIG. 1 is an illustration of an example of a prior art approach for generating a depth map for an image.
Figure 2:
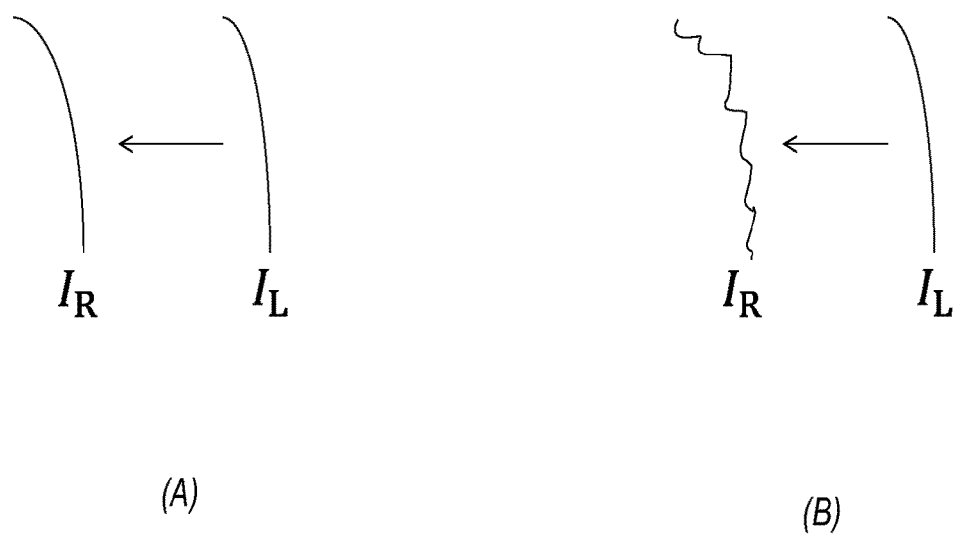
FIG. 2 is an illustration of an example of depth irregularities that may result from the approach of FIG. 1.

It has been attempted to mitigate such issues by applying a bilateral filter to depth maps where the filtering of the depth map is controlled based on characteristics of the image. However, whereas such an approach may improve the depth map for some scenarios it may be suboptimal in many practical applications and scenarios. In particular, it may result in irregular and noisy depth transitions for textured objects (as previously described and indicated by FIG. 2).

Figure 4:
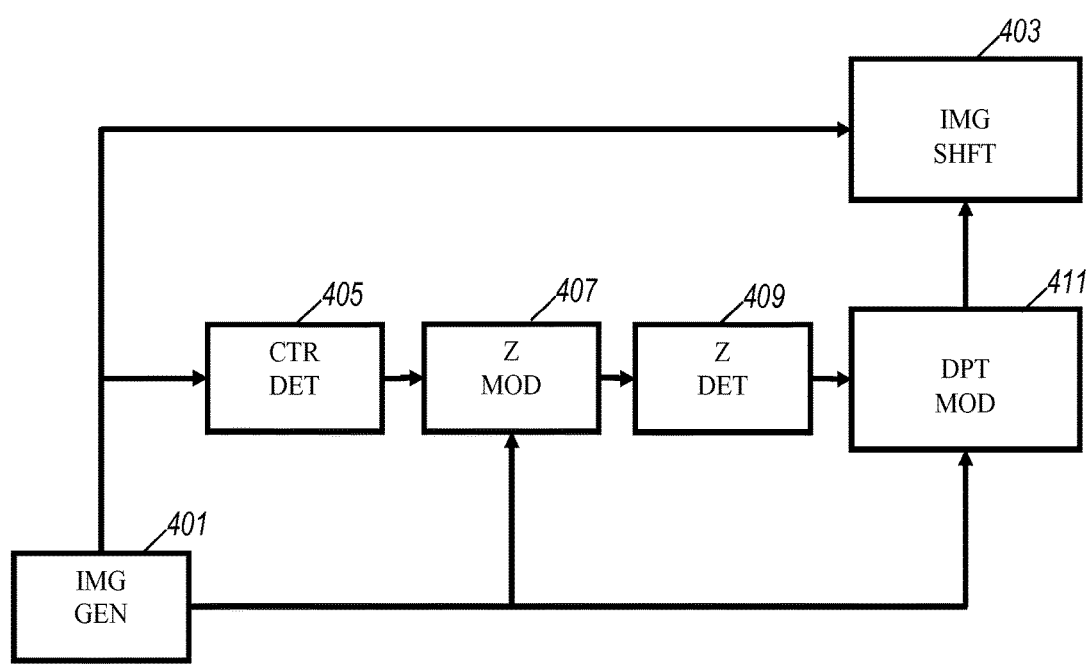
FIG. 4 illustrates an example of elements of an apparatus for generating a depth map in accordance with some embodiments of the prior art.

However, in the display driver 305 of FIG. 4, a modified depth map is generated by detecting contours in the image, fitting a depth model to detected contours, determining depth values based on the fitted depth model, and modifying the depth map based on these depth values. The modified depth map is then used for the view shifting.

In more detail, the image generator 401 comprises an image shifter 403 which is arranged to generate images for a given view direction based on an input image for a different view direction and a (modified) depth map associated with the input image. The image shifter 403 may in many embodiments be provided with a single view direction image of a three dimensional image representation provided by a plurality of images for different view directions, such as the left eye or right eye image of a stereo image. This may in particular be the case where such a three dimensional image representation has been received from an external source and a depth map has been locally generated by disparity estimation.

The image generator 401 is further coupled to a contour detector 405 which receives the input image from the image generator 401 and which is arranged to detect one or more contours in the image. Each contour may be determined to comprise a set of pixels for which a contour requirement is met. The requirement may specifically comprise a similarity requirement requiring that a similarity measure for the pixels is sufficiently high. The contour requirement may comprise a transition requirement which reflects that the pixels in the set are part of a transitional region, and specifically that it may be part of a transitional region which separates two regions that have sufficiently different (visual) properties but with the pixels of each region meeting a similarity criterion. In many embodiments, the contour requirement may include a geometric requirement for the set of pixels, such as a requirement that the pixel set belonging to a given contour substantially forms a vertical line.

The contour may specifically be determined as a curved line (also known as a curve) in the image, and specifically the first set of pixels may be determined as a set of connected pixels forming a curved line. The curvature may specifically be zero, i.e. the curved line may be a straight line.

The contour detector 405 is coupled to a model processor 407 which is arranged to generate a contour depth model for each of the detected contours by fitting a depth model to input depth values for the set of pixels. Thus, for a first contour comprising a first set of pixels, the model processor 407 is arranged to generate a first contour depth model by fitting a depth model to the input depth values, i.e. to the depth values of the input associated depth map. The initial depth model may specifically be a predetermined model with one or more variable parameters. The one or more variable parameters may then by the model processor 407 be adjusted such that the fit between the model and the depth values for the first set of pixels meet a requirement. The requirement may for example be that an accumulated depth value difference measure is minimized, for example the model may be adapted to minimize a sum of the squares of the depth value differences between the depth model value and the depth value of the input map for the set of pixels.

In the example where the contour is a single curved line, the contour depth model may correspond to a one dimensional curve in the three dimensional space formed by the depth dimension and the two dimensions of the image.

In some embodiments, the depth model may be in the form of a depth constraint for the depth of the depth values of the model. For example, a depth model may correspond to a constraint that a spatial variation of the depth values is sufficiently low. For example, the model may comprise or consist in a constraint of the spatial frequency distribution of the depth values.

As a specific example, the depth model may simply be a constant depth model, i.e. the model may be a single depth value model. Such a model may be adapted based on the input depth values of the associated depth map for the first pixels. Thus, the model may be applied by setting the depth values of the pixels belonging to the contour to the single model depth value. Specifically, the depth model may be adapted to reflect an extreme depth value (minimum or maximum), an average, or a median value of the input depth values that belong to the contour.

As a specific example, the model processor 407 may generate a single contour depth model for a first contour by setting a single depth value to the maximum value of the input depth values of the pixels belonging to the first contour.

As another example, the depth model may require that the spatial frequency spectrum for the depth values of the contour depth model is constrained, e.g. to include only lower frequencies. For example, it may be required that the spatial rate of change for the depth values is below a given level.

In many embodiments, the depth model may be a low pass filtering model which when applied to depth values of the associated depth map results in the depth contour model. Thus, the depth model constrains the higher spatial frequencies.

As a specific example, the model processor 407 may apply a spatial low pass filter to pixels of a contour to generate a depth contour model comprising the output values of the filtering. The low pass filter may specifically be a uniform filtering, and thus the depth contour model may be generated as a moving average of the depth values of the associated depth map.

As mentioned the contour may in many embodiments be a curved line (including a zero curvature line, i.e. a straight line), also often referred to as a curve, in the image (i.e. the set of pixels belonging to the contour may form a curve in the image). The contour depth model may correspondingly be a curved line in three dimensional space.

Indeed, the set of pixels belonging to a contour may in some embodiments be determined as e.g. a single line, or indeed may also be determined as a set of connected lines. In such an example, the contour depth model could be generated as a polyline consisting of three dimensional line segments. For example, the first contour could be determined as a vertical line. The depth model may be given as a line, i.e. it may constrain the contour to represent a linear depth variation. The system may fit this depth line to the depth values of the vertical contour. For example, the depth values for the end points of the depth line/contour line may be determined by minimising the mean square error between the actual depth values of the input depth map and the depth values of the depth line. As another example, the depth line may be fitted simply by setting the end points for the depth line to the depth values of the input depth map for the corresponding end points of the contour. The result may thus be a contour depth model for the contour which is constrained to have a linear and thus smooth progression.

The contour depth model may describe the evolution of depth values when moving along a contour which may be a curved line (the contour may in many cases not be closed, but e.g. describe the edge between an object and the background from a point A to a point B). The contour depth model may in many examples be considered a one dimensional description of depth as a function of the position on the contour (s): D(s), and could e.g. be a constant, linear or more complex polynomial. As another example, the contour depth model could be a low-pass filtered version of the input depth values of the contour, i.e. a low pass filter effect can be applied to only the depth values for pixels belonging to the contour curve.

It will further be appreciated that the contour need not be a curved line but may e.g. be defined as a two dimensional area in the image. For example, the contour may be determined as e.g. a rectangle. Such a shape may typically have one dimension that substantially exceeds the other (i.e. they may tend to be 'long and narrow') and the width may e.g. reflect uncertainty in the determination of the contour, i.e. a more graduated transition may be achieved.

Further, the contour depth model may be given as e.g. a two dimensional shape in the three dimensional space. For example, the depth model may be a two dimensional quadrilateral which is fitted to the contour by setting the depth value for the four points of the quadrilateral to the positions of the depth values of the four corners of a rectangular contour. Typically, the quadrilateral may also be a rectangle. Such an approach may e.g. provide a softer depth transition. It will further be appreciated that the depth model is not limited to e.g. a single rectangle but could be more complex. For example, the depth model could even be a polygon mesh structure which is then fitted to the input depth values for the contour, e.g. by determining the positions of the junctions of the mesh such that the resulting difference between the mesh depth values and the input depth values is minimized for the pixels of the contour.

The model processor may thus determine a contour depth model which defines depth values for the contour. The contour depth model is determined based on a depth model which imposes a constraint on the depth values of the contour. The constraint of the depth model may be a relative constraint, such as a constraint on the variation of the depth values of the contour (e.g. a maximum amount and/or frequency for variations). The contour depth model is determined based on the fitting of the depth model to the depth values of the pixels belonging to the contour, and typically based on depth values of only pixels belonging to the contour. Thus, the contour depth model provides depth values for pixels of the contour and is determined in response to the depth model and at least one depth value of a pixel belonging to the contour. In many embodiments, the contour depth model may be determined on the basis of depth values of all pixels belonging to the contour. The depth model may accordingly be adapted to the specific contour and may reflect at least one characteristic of the (depth values) of the contour. The contour depth model may thus specifically be a model of the depth values of the contour and may typically be determined by considering no other depth values and indeed no other pixels than the ones that are found to belong to the contour.

Thus, the contour depth model may be a highly locally adapted model which reflects at least one property of the depth values of the contour but is typically independent of all depth values for pixels not belonging to the contour. The contour depth model is thus a very local and restricted model which reflects only depth values of the contour itself.

The model processor 407 is coupled to a depth value determiner 409 which is arranged to determine depth model depth values for the pixels belonging to the contour. Thus, for a first contour, the depth value determiner 409 may evaluate the contour depth model (i.e. the fitted or adapted depth model) for the first contour in order to determine depth model depth values for the pixels belonging to the first contour, i.e. for the first set of pixels.

In the low complexity example where the contour depth model is a single depth model, the depth model depth values for the first set of pixels may simply be determined as the depth value of the model. However, for more complex models, determination of depth values may be performed individually for each pixel belonging to the contour. For example, in some embodiments, the contour depth model for a given contour may be represented by a function (e.g. expressed as a formula or equation), which is dependent on the specific position of the pixel (e.g. within the contour) and this function may be evaluated for each pixel of the contour.

The depth value determiner 409 may thus generate depth model depth values for the contour and accordingly may generate depth values for the contour which reflect predetermined restrictions and properties as reflected by the model. The model however may be adapted based on the actual input depth values and thus the resulting depth model depth values may reflect both the predetermined restrictions and constraints but may also reflect properties of the specific image.

The depth value determiner 409 is coupled to a modifier 411 which is arranged to generate a modified depth map from the associated depth map by modifying depth values of the input associated depth map. Specifically, the modifier 411 is arranged to modify at least one, and typically all, of the pixels belonging to a contour in dependence on the depth model depth value(s) determined by the depth value determiner 409 for the pixel(s). Thus, for at least a first pixel of a first contour, a first modified depth value is calculated/determined as a function of the determined depth model depth value for that first pixel.

In many embodiments, the modifier 411 may be arranged to set the modified depth value for a given pixel of a contour by replacing the input depth value of the associated depth map with the depth model depth value determined for that pixel.

For example, if the depth model is a single depth value model, the input depth values for a given contour may all be replaced by the determined single depth value. For example, in many embodiments, all pixels belonging to a given contour may be replaced by e.g. the maximum, minimum, median or average depth value for the contour.

It will be appreciated that the specific modification applied by the modifier may depend on the preferences and requirements of the individual embodiment. Further, in some embodiments, the modifier may further be arranged to perform modification of depth values that are not detected to belong to a contour. For example, in some embodiments, the modifier 411 may be arranged to apply a spatial filter to the input depth map, including applying the filter to both depth values that belong to a contour and depth values that do not belong to a contour. After the application of the filter, the modifier may be arranged to replace the depth values of the contours by the values from the contour depth model(s) (such as e.g. assign the same value to all pixels of a given contour, or it may e.g. be arranged to generate the output depth value as a combination of the filtered input depth value and the depth model value. It will be appreciated that the modification may e.g. also include other functions and operations such as e.g. a limitation, dynamic range change, a quantization change etc.

The modifier 411 is coupled to the image shifter 403 which proceeds to generate the new images using the modified depth map. Specifically, the determination of disparities and horizontal shifts when generating new images may be based on the depth of the modified depth map rather than on the original depth map.

The approach may provide improved performance in many scenarios and applications. In particular, the approach may tend to provide more robust, consistent, and less noisy depth information for particularly critical areas, such as often transitions between different objects at different depths. The approach may in particular when used to perform view direction shifting result in reduced artefacts and reduced perceived image degradations. Furthermore, these advantages may be achieved with relatively low complexity and resource usage. Also, the approach is typically robust and may e.g. provide quite a high degree of temporal stability for images that are part of a moving image sequence.

Figure 5:
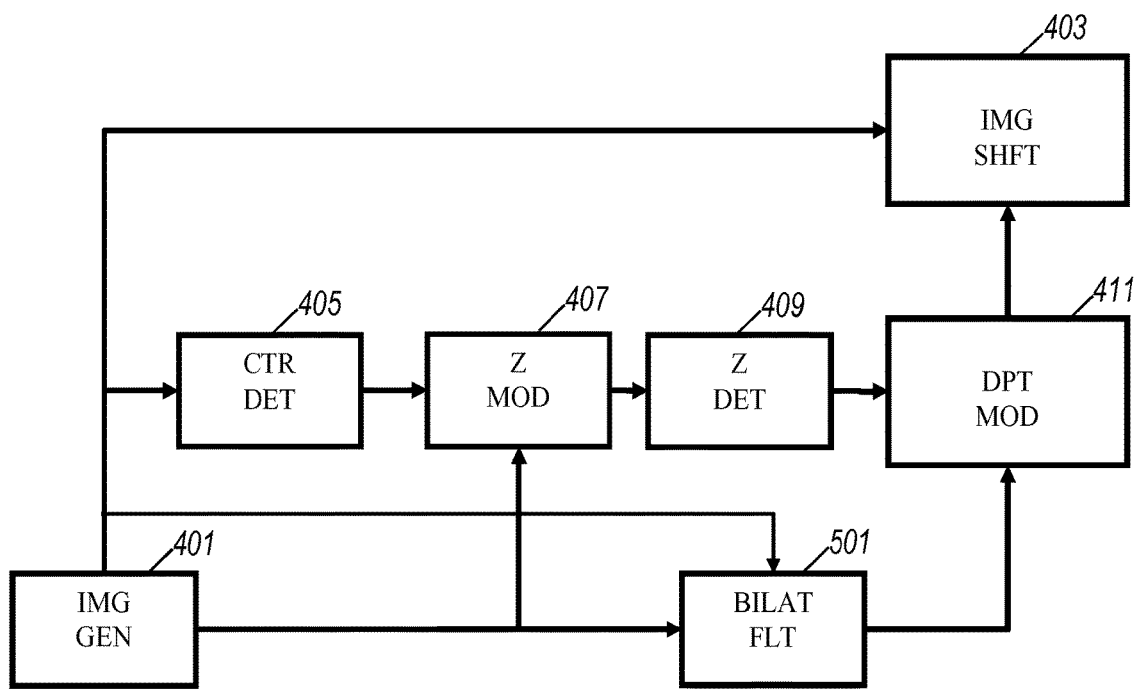
FIG. 5 illustrates an example of elements of an apparatus for generating a depth map in accordance with some embodiments of the prior art.

In many embodiments, the display driver 305 may further comprise a bilateral filter for filtering the associated depth map based on properties of the image. FIG. 5 illustrates such an example. The display driver 305 of FIG. 5 corresponds to that of FIG. 4 except that a bilateral filter 501 is included between the image generator 401 and the modifier 411.

The bilateral filter 501 filters the associated depth map before this is modified by the modifier 411. The filtering is a bilateral filter such that the kernel weights for a given pixel depend on properties in a neighborhood of the pixel in the input image. In this way, the depth map is filtered to more closely reflect the properties of the image and thus to provide improved consistency and reduced noise in many scenarios. For example, depth variations/noise within an area corresponding to a homogenous image object may be reduced substantially. However, the bilateral filtering may in some situations introduce artefacts and irregularities e.g. due to texture or other variations in the image (such as e.g. previously described with reference to FIG. 2). However, in the system of FIG. 5 such artefacts are mitigated, reduced, or potentially even removed by the subsequent modification of depth values belonging to contours. This modification may allow a much more consistent depth transition to occur along e.g. textured image objects and may result in substantially improved perceived quality of the presented three dimensional image.

In the system of FIG. 5, the fitting of the depth model is still performed using the input depth values of the associated depth map, i.e. using the depth map prior to the spatial bilateral filter. This has been found to provide improved performance and result in a more realistic three dimensional perception. In particular, it may reduce or mitigate artefacts or inconsistencies from the bilateral filtering (and thus from e.g. texture) negatively affecting the depth information for the detected contours. It may thus provide a more homogeneous and realistic seeming presentation of the image.

Thus, in the example of FIG. 5, contour depth values are estimated directly after disparity estimation with a subsequent modification of the depth map resulting from the bilateral filtering step.

It will be appreciated that different approaches and algorithms may be performed for detecting the contour(s) in the image.

A contour may specifically be a set of pixels containing at least two pixels that satisfy a visual property change constraint and a geometric constraint that depends on the pixel positions.

The visual property change constraint may specifically be a luminance and/or color change constraint. The visual property change constraint may specifically comprise a requirement that a difference measure between a visual property of at least one pixel of the contour and a visual property of at least one adjacent pixel not being part of the contour exceeds a threshold. Specifically, the visual property may be a property indicative of an intensity or color measure (such as a value or variation property), and/or may be indicative of a texture property.

In some embodiments, the visual property change constraint may specifically comprise a requirement that a difference measure between a visual property of at least one pixel of the contour and a visual property of a group of pixels exceeds a threshold where the group of pixels is a spatially contiguous group not being part of the contour and comprising at least one pixel adjacent to the at least one pixel of the contour. Specifically, the visual property may be a property indicative of an intensity or color measure (such as a value or variation property), and/or may be indicative of a texture property.

In some embodiments, the visual property change constraint may be a texture dissimilarity constraint. This may compare the visual structure (intensity, color and or texture) on both sides of a contour edge or outline, requiring a minimum difference to exist between the two sides. An example requirement is a minimum color difference between the adjacent pixels on each side of the contour.

As another example, the visual property change constraint/texture dissimilarity constraint may require that a difference measure between a visual property of a set of pixels on one side of the contour and a visual property of a set of pixels on the other side of the contour exceeds a threshold. Specifically, the visual property may be indicative of a texture property (such as statistical distribution or standard deviation).

A geometric constraint could be that all pixels in the set have a given maximum Euclidean distance to a straight line. Another geometric constraint could be that all pixels in the set form an 8-connected component on the rectangular pixel grid.

Specifically, the geometric constraint may require that a geometric property indicative of a shape of at least part of an outline of the contour meets a requirement. The requirement may specifically be that a difference measure between the determined geometric property and an expected geometric property for an expected contour shape does not exceed a threshold.

It will be appreciated that different algorithms and criteria for detecting contour may be used in different embodiments. In general, the contour detector 405 may detect a contour by checking both the color intensity constraint and the geometric constraint for a given set of pixels. If both constraints are met for a given set, then this set is considered a contour.

The test may for example be performed by the contour detector 405 first determining a set of pixels meeting the visual property change constraint. It may then proceed to evaluate the geometric constraint for the resulting set of pixels. If the geometric constraint is met, the set of pixels may be considered to be a contour.

In many embodiments, the contour detector 405 may be arranged to detect the first contour based on a geometric requirement for the first set of pixels. The geometric requirement may be explicitly considered by e.g. evaluating a requirement with respect to a given pixel set or may e.g. be implicitly considered by the requirement being built into the algorithm, for example by the algorithm inherently considering only pixels that meet a geometric constraint.

As a specific example, the contour detector 405 may be arranged to consider only pixel sets that form a single vertical line. Thus, if a given pixel belongs to a contour (or is being evaluated to determine whether it belongs to a contour) only neighbor pixels in the same column are evaluated as potential candidates for the same contour.

The geometric requirement may for example include a requirement for a size of the contour formed by the set of pixels. For example, if contours are considered to correspond to vertical lines, the geometric requirement may include a consideration that the length of the line exceeds a given threshold. Thus, short lines of pixels that e.g. differentiate two image areas may not be considered sufficiently large to be designated as contours.

In the following, a specific approach for efficiently detecting contours will be described. In the example, the contour detector 405 is aimed at detecting contours by detecting longer, vertically oriented lines since these are often likely to reflect object boundaries (e.g. a light pole, a door post, the vertical boundary of a computer screen, the vertical boundary of a large character from a text string etc.). Thus, the contour requirement may include requirements that the pixels of a pixel set being designated as a contour form a vertical line which has a length of more than a given threshold.

Figure 6:
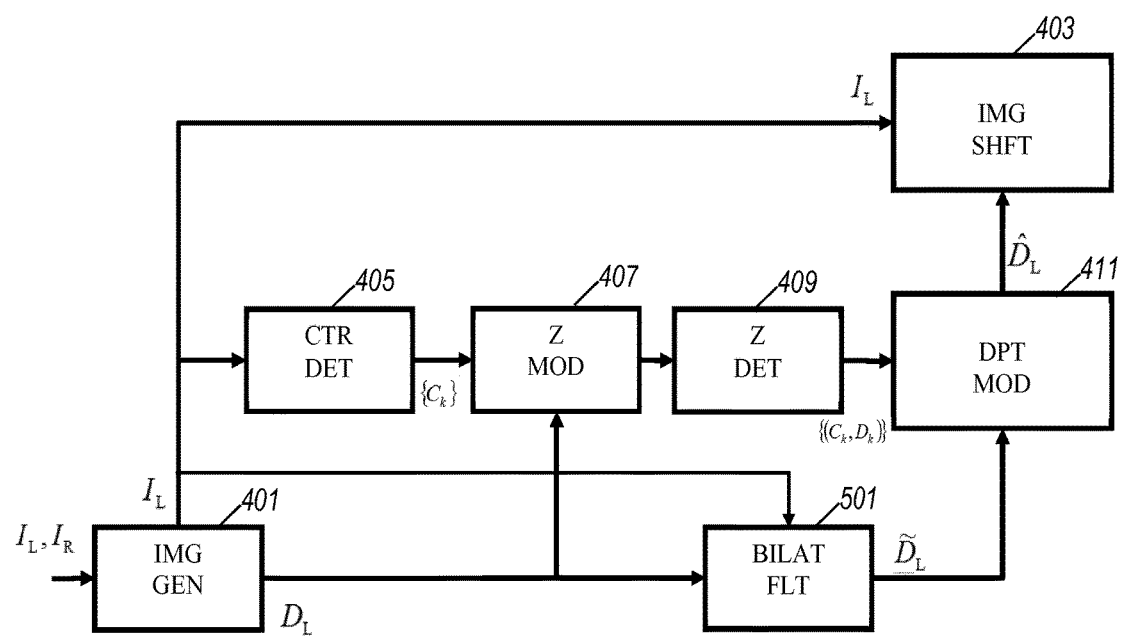
FIG. 6 illustrates an example of elements of an apparatus for generating a depth map in accordance with some embodiments of the prior art.

The example is described with respect to FIG. 6 which may be considered a specific, exemplary instantiation of the system of FIG. 5.

In the example, the image generator 401 receives a left eye image $I_L$ and a right eye image $I_R$. It then proceeds to perform disparity estimation to generate the associated depth map $D_L$. In the present example, the depth map is generated for the left eye image but in other embodiments, a right eye depth map may e.g. be used instead. Indeed, a right eye depth map may in some embodiments even be used as a depth map for a left eye image. Any offset may e.g. be compensated for, or the differences may be considered to be sufficiently small.

The contour detector 405 receives the left-eye image $I_L$ and outputs a set of contours $C_k$ where each contour comprises a set of pixels.

In the specific example, a contour detection algorithm is implemented which takes as input a color image I and produces as output a contour map L, where L contains per pixel (i,j) the length of the contour to which pixel (i,j) belongs. This contour map L may also be referred to as a length map or contour length map. The algorithm performs one top-down scan visiting all pixel locations followed by one bottom-up scan. Hence, it has very low computational complexity and can be implemented in hardware with a relatively low resource requirement.

During the top-down scan, the algorithm detects whether a pixel (i,j) is on a step edge or not. If so, the contour length map L is increased by one relative to the length determined for the pixel directly above. Specifically, the operation may be described by the following recursive formula:

$$L_{i,j} \leftarrow L_{i-1,j} + \left( \left( \sum_{k \in \{r,g,b\}} \frac{|I_{i,j}^{(k)} - I_{i-1,j}^{(k)}| + |I_{i,j}^{(k)} - I_{i,j-1}^{(k)}|}{2} \right) > E_{min} \right)$$

where the summation is over the color channels (e.g. over the red, green and blue color channels for an RGB signal) and $E_{min}$ is a suitable threshold for edge detection (a value of around 30 for an image with three 8-bit color channels has been found suitable for many applications). The condition within the brackets returns either 1 or 0 which implies that at each image row, the contour length map increases by 1 or not.

In a second, bottom-up, scan the length values found in the first scan are modified but in this scan the edge detection consideration is not included. Rather, the length value for a given pixel is set to the maximum of the length value stored for that pixel and the length value stored for the pixel immediately below:

$$L_{i,j} \leftarrow \max(L_{i,j}, L_{i+1,j}).$$

This may complete the creation of a contour length map where a value is stored for each pixel indicating the length of the vertical contour line to which the pixel is considered to belong. For pixels that do not belong to a contour, the value will be zero.

Figure 7:
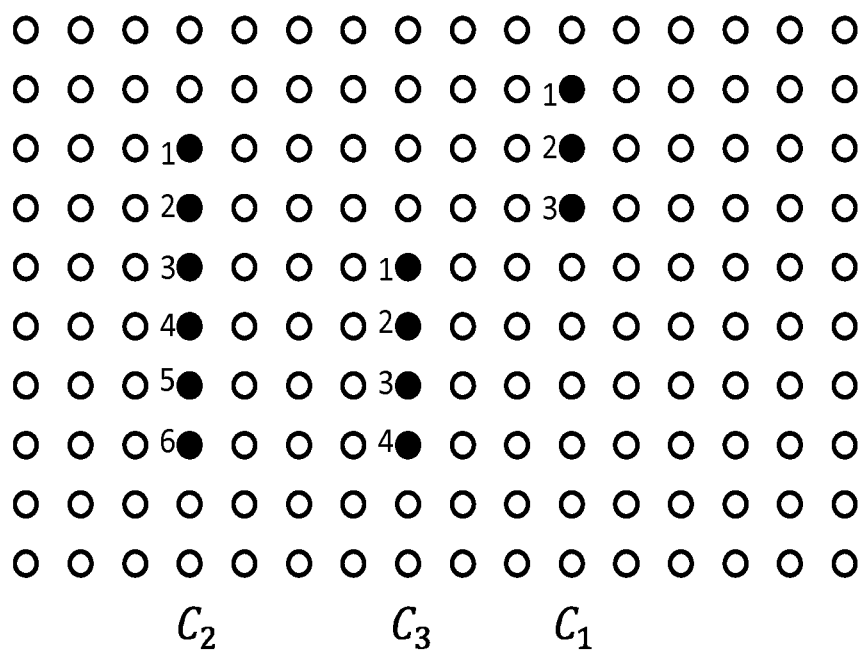
FIGS. 7-9 illustrates examples of values determined for pixels for a specific implementation of the apparatus of FIG. 4.
Figure 8:
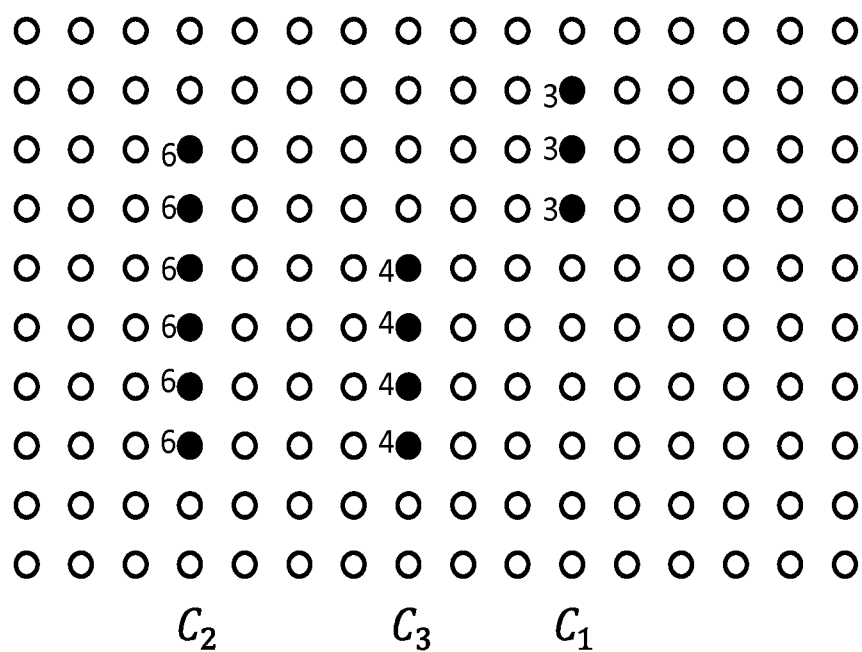

FIG. 7 illustrates an example of the length map after a first scan and FIG. 8 illustrates an example of the resulting contour length map, i.e. the length map after the second scan. In this resulting contour length map, each pixel position has a value corresponding to the length of the contour to which it is considered to belong.

FIG. 7 illustrates the contour length map L after the first scan with all values being zero except for pixels denoted by black dots. The numbers indicate the lengths assigned to the contour pixels by the described first scan. As can be seen, the length map is only correct at the bottom end of each contour. FIG. 8 illustrates how the second scan propagates these values to all pixels of a contour.

In the described examples, the contour detection and the generation of the contour depth model are considered as two separate, sequential steps. This may indeed be the case in many embodiments, and in particular in embodiments that use more complex depth models. However, in some embodiments the contour detection, the generation of the contour depth model, and the generation of the modified depth map may be combined into a single step. This may for example be the case for an example of the contours being constrained to be vertical straight lines and with the depth model e.g. simply being a single value corresponding to the maximum depth level encountered in the contour. The approach may be similar to that described with respect to FIGS. 6-8 and may specifically also use a two stage scan approach.

In such an example, during a first top-to-bottom scan, the final depth $\hat{D}_L$ may be set using a recursive update function that depends on contour length $L_{min}$. For example, the following updated formula may be applied:

$$\hat{D}_{i,j} \leftarrow \begin{cases} \max(\hat{D}_{i-1,j}, \max(D_{i,j}, D_{i-1,j})) & \text{if } L_{i,j} > L_{min} \wedge L_{i-1,j} > L_{min} \\ \tilde{D}_{i,j} & \text{otherwise} \end{cases}$$

$\tilde{D}_{i,j}$ is the filtered disparity value (using a bilateral or other filter). Effectively, during the top-to-bottom scan, the original (unfiltered) disparity $D_L$ is assumed to be the correct disparity when it lies on a contour (defined here as a vertically oriented connected set of edge pixels of a minimum length $L_{min}$ which e.g. may be set to 30 pixels). Not only is the original disparity $D_L$ assumed to be correct for a contour pixel, but in addition the maximum value is propagated down the contour (as a consequence of the inner max operation in the formula). Thus after a first scan, the lowest pixel of each contour is set to the maximum value of the depths of the pixels in the contour.

The depth level of all pixels of a given contour may then be set to this maximum value by an additional bottom-up scan. In this scan, the following recursive update equation may e.g. be used:

$$\hat{D}_{i,j} \leftarrow \begin{cases} \max(\hat{D}_{i,j}, \hat{D}_{i+1,j}) & \text{if } L_{i,j} > L_{min} \wedge L_{i+1,j} > L_{min} \\ \tilde{D}_{i,j} & \text{otherwise} \end{cases}.$$

Figure 9:
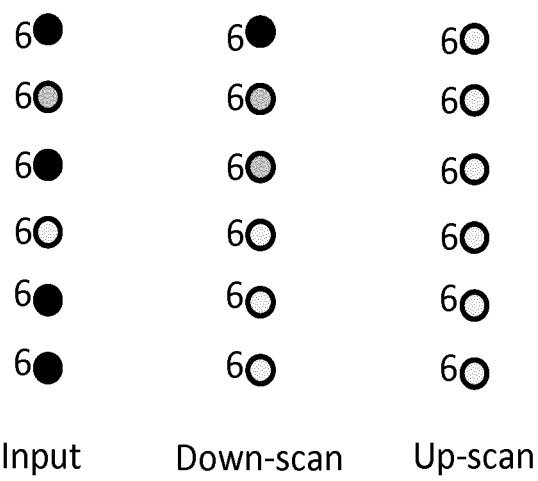

FIG. 9 illustrates the result of applying such top-to-bottom and bottom-to-top scans to the contour of length 6 of FIGS. 7 and 8 (the depth is indicated by the darkness of the pixel).

In this way, a modified depth map is directly generated wherein a depth model (being a maximum value depth model) is adapted to the specific input map and with the depth values of the contours of the modified depth map being replaced by this depth model value, i.e. by the maximum depth value of the contour.

The specific approach has been found to function well in practice. This reflects that it is very often appropriate to assume that the original disparity determined before filtering is accurate since a disparity estimation algorithm is typically performing well at contours due to the presence of texture. Further, propagating the maximum depth value over the contour sets the contour to a single constant depth value and pulls the contour forward towards the viewer. This may ensure that the contour is rendered without e.g. strange bends or other artefacts.

In the example, the contour detection is inherently constrained by a geometric requirement that the contours should be a vertical line. This may provide particularly advantageous performance in many scenarios. However, in other embodiments, other geometric requirements may be used. For example, in some embodiments, the geometric requirement may comprise a requirement for the pixels of a contour to form a geometric shape that does not exceed a maximum curvature. The curvature may be indicative of the degree to which a contour/contour candidate is curved, and specifically for a curved line may indicate the degree to which it deviates from a straight line.

A straight line has a curvature of 0 and a circle has curvature $\kappa=1/R$. If we assume that a contour would correspond to part of a circle we could require that this circle has a given minimum radius R (or a given maximum curvature $\kappa$). Curvature can also be calculated for a more complex parametric curve. For such curves a low curvature on all points on the curve means that the curve does not rapidly change direction. Curvature is thus a useful criterion to detect contours.

For example, in some embodiments, the contour detector 405 may be arranged to first collect pixels in an ordered list based on the color intensity constraint and a first geometric constraint (e.g. 8-connectedness), fit a parametric model curve to the pixel locations and then check if the maximum curvature stays below a given maximum curvature for all points on the curve. If this second geometric constraint is satisfied, we would accept the curve as a new contour.

Thus, in some embodiments, the contour detector 405 may be arranged to fit a model curve to a shape of a contour candidate and to determine the curvature for the contour candidate as a curvature of the model curve. It may then be required that the curvature does not exceed a threshold. The curvature for the model curve may for example be determined in response to a predetermined function for calculating a curvature for the model curve. Thus, the contour detector 405 may e.g. calculate the parameters for fitting the model curve, and the curvature may be calculated as a function of these parameters. The exact function, and/or the threshold (maximum curvature) may depend on the preferences and requirements of the individual application and embodiment.

The use of a geometric requirement of a maximum curvature may provide a less strict requirement than requiring a straight line, and thus allow some variation, while at the same time require contours to be restricted to shapes considered to be typical of many contours.

Also, in the example, a low complexity model has been used in the form of a single/constant depth value model. This has been found to provide advantageous performance in many embodiments by providing a consistent depth along the contour.

In some embodiments, it may be advantageous to use an extreme value, such as the maximum or minimum depth value. This may tend to position object transitions at the depth of the object furthest to the front or furthest to the back. In other embodiments, the single value of the model may be set to be the average or median value for the contour. This may tend to remove noise from the raw depth measurements.

However, in other embodiments a more complex model may be used. For example, the model may be a linear depth value model (specifically a single first order polynomial) where e.g. a linear depth gradient and offset is fitted to the depth values. The fitting may for example seek to minimize the square error between the input depth values for the pixels and the depth model depth values for the pixels of the contour as determined by the linear depth gradient and offset.

In other embodiments, the linear depth value model may be formed by a plurality of piecewise linear (first order polynomial) subsections that can individually be fitted to the input depth values of the contour.

Such approaches may provide a more accurate reflection of depth transitions in many scenarios while still allowing reduced noise and/or increased consistency of the depth transitions.

In other embodiments, the depth model may be a higher order polynomial (or plurality of higher order polynomials) which may be fitted to the input depth values.

In the described approach, the modified depth map was generated by replacing input depth values in the associated depth map by depth values determined by evaluating the contour depth model. This may facilitate implementation and reduce resource usage while providing high performance in many embodiments. Indeed, it may result in very consistent and homogeneous depth values at object transitions.

However, in other embodiments, the modified depth map may be generated by combining input depth values and the determined depth model depth values. Specifically, for a given pixel belonging to a detected contour, the depth value may be generated as a combination of the original input depth value for the pixel and the depth model depth value that has been generated by the depth value determiner 409. Such an approach may provide a smoother and intermediate depth which in many scenarios may result in an improved perceived quality.

In the example, the contour detector 405 simply determines whether pixels belong to a contour or not, and if so the depth model depth value is used. However, in some embodiments, the contour detector 405 may be arranged to provide a soft-decision value. Thus, rather than merely indicating whether pixels belong to a contour or not, the contour detector 405 may provide a value which indicates a confidence or estimated probability that the pixel belongs to the contour.

It will be appreciated that generation of soft-decision rather than hard-decision values is common for many detection or estimation algorithms. For example, many detection algorithms generate a value which is then compared to a threshold in order to make a binary decision. In such scenarios, the value may instead be used as a soft decision value for the detection.

The contour detector 405 may generate the soft-decision value as any suitable value that is indicative of an estimated likelihood that a pixel belongs to a contour. In many embodiments, a soft decision detection value may be generated in response to a geometric property of the first contour. For example, if a set of contiguous pixels have been determined to potentially be part of a contour (e.g. they are detected as edge or transition pixels), the contour detector 405 may generate a soft decision value which reflects how closely the resulting geometric shape corresponds to that expected by a contour.

For example, in the example of FIGS. 5-8, the length of the contour may be considered a soft decision detection value. Indeed, the longer the detected contour the more likely it is to reflect an actual contour and the less likely it is that the detection may be caused by random variations.

In such embodiments, the modifier 411 may be arranged to generate the depth value for the modified depth map as a weighted combination, and specifically a weighted summation, of the input depth value and the depth model depth value. The weights for each depth may be set as a function of the soft-decision detection value.

Thus, in such an approach, the modified depth value may not be generated simply by either selecting the input depth value or the depth model depth value. Rather, a weighted combination of these depth values may be performed based on the soft-decision detection value. For example, if the confidence value/soft-decision detection value a is generated as a value between 0 and 1 reflecting an estimated probability that the pixel belongs to a contour, the modified depth value for that pixel may be calculated as:

$$\hat{D}_{i,j} = \alpha_{i,j} D_{i,j}^{(C)} + (1-\alpha_{i,j}) D_{i,j}.$$

where $D_{i,j}^{(C)}$ denotes the depth model value predicted from the contour, and $D_{i,j}$ denotes the input depth value.

Such an approach has in practice been found to in particular limit temporal inconsistency of depth maps in many scenarios.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating a depth map, the apparatus comprising:

an image generator circuit arranged to provide an image and an associated depth map, wherein the associated depth map comprises input depth values;

a contour detector circuit arranged to detect at least a first contour in the image, the first contour comprising a first set of pixels;

a model processor circuit arranged to generate a contour depth model for the first contour by fitting a depth model to input depth values for the first set of pixels;

a depth value determiner circuit arranged to determine a depth model depth value for at least a first pixel of the first set of pixels from the contour depth model; and a modifier circuit arranged to generate a modified depth map from the associated depth map by modifying depth values of the associated depth map;

wherein the modifier circuit is further arranged to generate a first modified depth value for the first pixel in the modified depth map in response to the depth model depth value.

2. The apparatus of claim 1 wherein the modifier circuit is arranged to set the first modified depth value to the depth model depth value.

3. The apparatus of claim 1 wherein the modifier circuit is arranged to generate the first modified depth value as a combination of the depth model depth value and an input depth value for the first pixel.

4. The apparatus of claim 3 wherein the contour detector circuit is arranged to generate a soft decision detection value, the combination is a weighted combination, and the modifier circuit is arranged to determine a weighting of at least one of the depth model depth value and the input depth value for the first pixel in response to the soft-decision detection value.

5. The apparatus of claim 4 wherein the contour detector circuit is arranged to generate the soft decision detection value in response to a geometric property of the first contour.

6. The apparatus of claim 1 wherein the contour depth model is a constant depth value model.

7. The apparatus of claim 6 wherein the model processor circuit is arranged to generate the contour depth model as one of an extreme input depth value, an average input depth value, and a median input depth value for the first set of pixels.

8. The apparatus of claim 1 wherein the contour depth model is a linear depth value model.

9. The apparatus of claim 1 wherein the contour detector circuit is arranged to determine the first contour under a constraint of a geometric requirement for the first set of pixels.

10. The apparatus of claim 9 wherein the geometric requirement comprises a requirement for the first set of pixels to form a geometric shape not exceeding a maximum curvature.

11. The apparatus of claim 1 further comprising a bilateral filter arranged to filter the associated depth map based on the image prior to modification by the modifier circuit.

12. The apparatus of claim 1 wherein the contour detector circuit is arranged to detect the first contour in response to a contour requirement, the contour requirement comprising both a visual property change constraint and a geometric constraint.

13. The apparatus of claim 1 wherein the image generator circuit is arranged to generate the associated depth map in response to a disparity estimation based on the image and a second image corresponding to a different viewing direction.

14. A method of generating a depth map, the method comprising:

providing an image and an associated depth map, wherein the associated depth map comprises input depth values;

detecting at least a first contour in the image, the first contour comprising a first set of pixels;

generating a contour depth model for the first contour by fitting a depth model to input depth values for the first set of pixels;

determining a depth model depth value for at least a first pixel of the first set of pixels from the contour depth model; and generating a modified depth map from the associated depth map by modifying depth values of the associated depth map, wherein generating a modified depth map comprises generating a first modified depth value for the first pixel in the modified depth map in response to the depth model depth value.

15. A computer program product comprising computer program code means adapted to perform all the steps of claim 14 when the program is run on a computer.

16. The method of claim 14 wherein the first modified depth value is set to the depth model depth value.

17. The method of claim 14 further comprising generating the first modified depth value as a combination of the depth model depth value and an input depth value for the first pixel.

18. The method of claim 17 wherein the of the at least first counter is arranged to generate a soft decision detection value, the combination is a weighted combination, generating a modified depth map is determined by a weighting of at least one of the depth model depth value and the input depth value for the first pixel in response to the soft-decision detection value.

19. The method of claim 18 wherein the generating of the soft decision detection value is in response to a geometric property of the first contour.

20. The method of claim 14 wherein the contour depth model is a constant depth value model.

\* \* \* \* \*